May 26, 1925.
F. A. OTTOW
MILK BOTTLE CARRIER
Filed Dec. 13, 1923
1,539,201
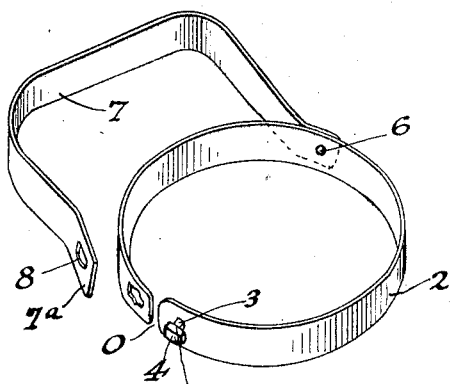
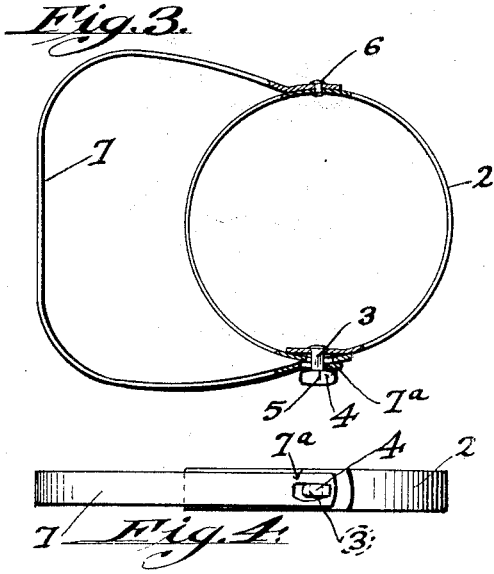
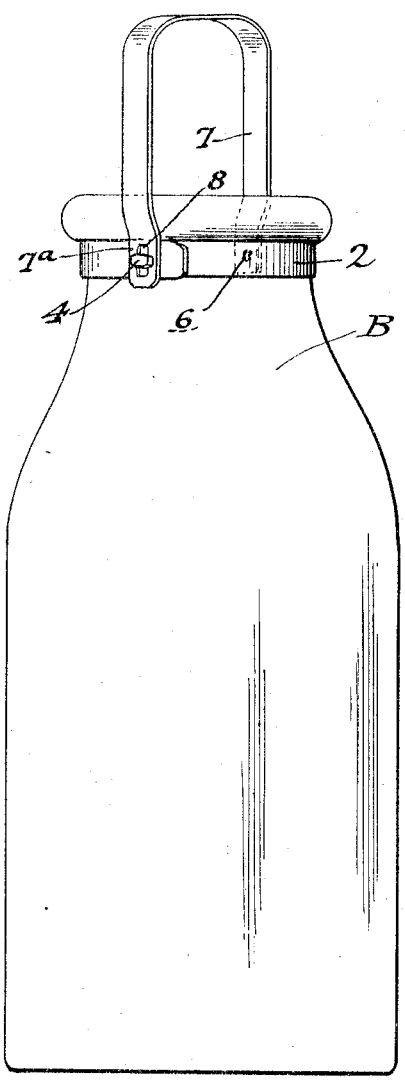
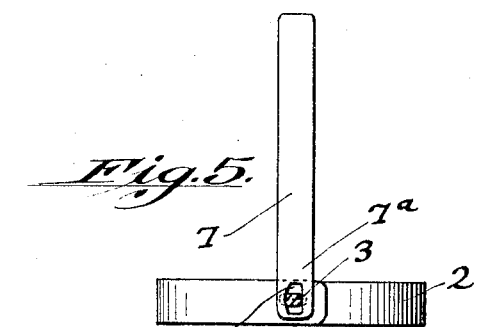
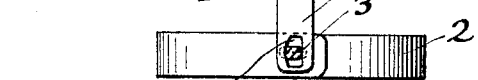
Inventor
FREDERICK A. OTTOW Patented May 26, 1925.

1,539,201

UNITED STATES PATENT OFFICE.

FREDERICK A. OTTOW, OF LOS ANGELES, CALIFORNIA.

MILK-BOTTLE CARRIER.

Application filed December 13, 1923. Serial No. 680,416.

*To all whom it may concern:*

Be it known that I, FREDERICK A. OTTOW, a citizen of the United States, residing at Los Angeles, in the county of Los Angeles and State of California, have invented new and useful Improvements in Milk-Bottle Carriers, of which the following is a specification.

This invention relates to milk bottle carriers and has for its object to provide a simple, inexpensive and substantial device adapted to be readily attached to the neck of the milk bottle.

Other objects and advantages will be made manifest in the following specification of an embodiment of the invention illustrated in the accompanying drawings, wherein—

Fig. 1 is a side elevation showing the device applied to a bottle.

Fig. 2 is a perspective of the device.

Fig. 3 is a plan with parts in section.

Fig. 4 is a side elevation showing the handle turned to lower releasing position as in Fig. 3.

Fig. 5 is a side elevation showing the handle upturned and showing the pivot stem in section.

The bottle carrier consists of a resilient band 2, split at one side to provide an opening O whereby to allow the band being passed down over the neck bead of a bottle B. One end of the band is provided with a pin 3, having on its outer end a head 4, the under-faces 5 of which are outwardly inclined from the stem 3. The head is somewhat elongated with its length parallel to the edges of the band 2. At the opposite side of the band is a pivot 6 upon which is mounted one end of a bow or handle 7, the opposite end of which is provided with an elongated slot 8 adapted to be passed down over the head 4 when the handle 7 is turned into the plane of the band 2.

When the handle has been thus applied it is turned to an upright position, Figs. 1 and 5, with the result that the detachable end of the handle is locked over the head 4. The end 7ª of the handle and the perforated end of the band 2 overlap each other when the device is applied, as in Fig. 1, and when the handle is turned the end 7ª of the handle engages the inclined shoulders 5 of the head 4, with the result that the handle end is compressed against the end of the band and the latter is also compressed in applied position.

It is seen upon referring to Fig. 5 that the shank of the pin 3 is provided with substantially rectangular sides. The slot 8 is of greater width at its center than near its ends; consequently when the handle 7 has been placed over the head 4 of the pin 3 and swung into vertical position, the handle 7 may be slightly raised, causing the lower and narrower end of the slot 8 to engage the vertical sides of the shank of the pin 3, which will maintain the handle 7 in elevated position.

Further embodiments, modifications and variations may be resorted to within the principle of the invention.

What is claimed is:

1. A milk bottle carrier consisting of a split band, having on one end a pin with an elongated head, the other end of the band being apertured to receive the head of the pin, and a handle pivoted at one end on one side of the band and having in its opposite end an aperture to receive the head of the pin, said head holding the handle when the latter is turned to a carrying position.

2. A milk bottle carrier consisting of a split band, having on one end a pin with a head, the other end of the band being apertured to receive the head of the pin, and a handle pivoted at one end on one side of the band and having in its opposite end an aperture to receive the head of the pin, said head holding the handle when the latter is turned to a carrying position, the head having inclined shoulders operative to compress the applied handle end when the handle is turned over the head.

3. A milk bottle carrier consisting of a split band having on one end a pin with an elongated head, the other end of the pin being apertured to receive the head of the pin, a shank on said pin having vertical sides, and a handle pivoted at one end on one side of the band and having in its opposite end an aperture with an end of reduced width, said aperture being adapted to receive the head of the pin, and said end being adapted to engage the vertical sides of said shank thereby holding said handle in vertical position.

In testimony whereof I have signed my name to this specification.

FREDERICK A. OTTOW.